US008370499B2

(12) United States Patent
Guntupalli et al.

(10) Patent No.: US 8,370,499 B2
(45) Date of Patent: Feb. 5, 2013

(54) SELF-SERVICE TERMINAL

(75) Inventors: Vishwam Guntupalli, Khammam (IN); Ian M. Joy, Fife (GB); Ashalatha Behara, Andra Pradesh (IN)

(73) Assignee: NCR Corporation, Duluth, GA (US)

( * ) Notice: Subject to any disclaimer, the term of this patent is extended or adjusted under 35 U.S.C. 154(b) by 213 days.

(21) Appl. No.: 12/650,318

(22) Filed: Dec. 30, 2009

(65) Prior Publication Data

US 2011/0161498 A1 Jun. 30, 2011

(51) Int. Cl.
*G06F 15/16* (2006.01)

(52) U.S. Cl. ........ 709/227; 709/219; 709/228; 709/229; 380/227; 380/228; 380/229; 380/230; 380/231; 380/232; 380/233; 380/234; 705/41; 705/42; 705/43; 705/44

(58) Field of Classification Search ........................ None
See application file for complete search history.

(56) References Cited

U.S. PATENT DOCUMENTS

| | | | | |
|---|---|---|---|---|
| 5,280,527 | A * | 1/1994 | Gullman et al. | 713/184 |
| 5,913,029 | A * | 6/1999 | Shostak | 709/203 |
| 5,963,647 | A * | 10/1999 | Downing et al. | 705/39 |
| 6,308,887 | B1 * | 10/2001 | Korman et al. | 235/379 |
| 6,400,272 | B1 * | 6/2002 | Holtzman et al. | 340/572.1 |
| 6,588,664 | B2 * | 7/2003 | Davies | 235/462.01 |
| 6,871,288 | B2 * | 3/2005 | Russikoff | 726/19 |
| 7,453,347 | B1 * | 11/2008 | Bogat | 340/10.1 |
| 7,499,873 | B2 * | 3/2009 | Barron | 705/14.14 |
| 7,584,885 | B1 * | 9/2009 | Douglass | 235/379 |
| 7,617,157 | B2 * | 11/2009 | Seifert et al. | 705/43 |
| 7,780,074 | B1 * | 8/2010 | Crews et al. | 235/379 |
| 7,828,646 | B2 * | 11/2010 | Franks, Jr. | 463/25 |
| 2002/0016763 | A1 * | 2/2002 | March | 705/39 |
| 2002/0038818 | A1 * | 4/2002 | Zingher et al. | 235/381 |
| 2002/0147684 | A1 * | 10/2002 | Kirkhope et al. | 705/43 |
| 2003/0101134 | A1 * | 5/2003 | Liu et al. | 705/39 |
| 2003/0236749 | A1 * | 12/2003 | Shergalis | 705/43 |
| 2006/0015358 | A1 * | 1/2006 | Chua | 705/1 |
| 2007/0235521 | A1 * | 10/2007 | Mateen et al. | 235/379 |
| 2007/0235522 | A1 * | 10/2007 | Mateen et al. | 235/379 |
| 2008/0313087 | A1 * | 12/2008 | Joseph et al. | 705/66 |
| 2009/0183008 | A1 * | 7/2009 | Jobmann | 713/186 |
| 2010/0070418 | A1 * | 3/2010 | Seifert et al. | 705/64 |
| 2011/0161498 | A1 * | 6/2011 | Guntupalli et al. | 709/227 |

OTHER PUBLICATIONS

Wikipedia, Automated teller machine, pp. 1-16.*

* cited by examiner

*Primary Examiner* — Backhean Tiv
(74) *Attorney, Agent, or Firm* — Peter H. Priest

(57) ABSTRACT

A self-service terminal comprises: a plurality of session initiation devices, each associated with an initiation token, so that a customer can initiate a transaction using one of a plurality of different initiation tokens. The terminal further comprises a plurality of session suppliers, each session supplier being associated with one of the session initiation devices, and each session supplier being operable: (i) to receive from its associated session initiation device, information from an initiation token provided by a customer, and (ii) to create an electronic access token based on the received information. The terminal also comprises a session supplier aggregate operable to receive an electronic access token from one of the session suppliers for each session to be created; and a session component operable (i) to receive the electronic access token from the session supplier aggregate and (ii) to create a session based on the received electronic access token.

20 Claims, 4 Drawing Sheets

SELF-SERVICE TERMINAL

FIELD OF INVENTION

The present invention relates to improvements in or relating to self-service terminals (SSTs).

BACKGROUND OF INVENTION

SSTs allow customers to perform transactions in an unassisted manner and/or in an unattended environment.

An SST typically allows a customer to initiate a transaction using an identity token, such as a magnetic stripe and/or integrated circuit card. For SSTs such as automated teller machines (ATMs), customers are issued with identity cards that are used with each transaction. However, it is becoming more common for new types of SSTs to be provided, such as movie rental kiosks, hotel check-in kiosks, airline check-in kiosks, that do not require a dedicated customer identity card. For these types of SSTs, a customer may initiate a transaction using a different token. These tokens may include customer-identifying information, such as a passport, a driver license, or the like. Alternatively, these tokens may not include any customer-identifying information, such as a voucher, a ticket, or the like.

Currently, different software is required to support different mechanisms for initiating a transaction at an SST. The software has to ensure that the token presented has sufficient information to allow the transaction to be completed. This makes it time consuming and expensive to update an SST to accept a new type of token for initiating a transaction.

It is also problematic to update software in a network of SSTs, where different mechanisms for initiating transactions are used in different SSTs on the network.

It is among the objects of an embodiment of the present invention to obviate or mitigate this problem or other problems associated with prior art SSTs.

DEFINITIONS

The following definitions are used herein:

An "initiation token" ("IT"). This is data that is provided by a customer, either directly (for example, by typing in the data), or indirectly (for example, by being printed or encoded on a data carrier), to access a transaction offered by a self-service terminal.

A "physical initiation token" ("PIT"). This is a physical object that is presented by a customer to access a transaction offered by a self-service terminal. A physical initiation token is a subset of initiation tokens. A PIT does not include data that is typed in by a customer, it only includes physical objects on which data is printed or encoded so that the data can be extracted or derived by a suitable reading device. Examples of PITs include: a magnetic stripe card; an integrated circuit card; a radiofrequency tag (for example, an RFID tag); a magnetic tag; a memory cell; part of a customer's body (for example, a finger, a hand, an eye, a face) for use with a biometrics sensor; a coupon having text printed thereon; a voucher having a barcode printed thereon; a cellular radiofrequency telephone; and the like.

A "session initiation device" ("SID"). This is a module within an SST that receives an initiation token from a customer. Where the initiation token is a PIT, the module extracts or derives information from the PIT. Examples of session initiation devices include: card readers for reading card-based physical initiation tokens; RF readers for reading radiofrequency tags; biometrics readers (such as fingerprint readers, iris scanners, hand geometry readers, and the like); cameras for imaging coupons and applying OCR (optical character recognition) to the captured image; barcode readers for reading a barcode on a voucher or coupon; touch-sensitive display panels for receiving data typed in by a customer; and the like. A session initiation device may comprise a combination of modules that the SST uses to extract or derive information relating to the customer. For example, a user may have to swipe a magnetic stripe card and then press his/her finger onto a biometric reader to initiate a session. The combination of the magnetic card reader and the biometric reader would comprise a session initiation device.

An "electronic access token" ("EAT"). This is an electronic data structure that is created and populated with data from an initiation token. The electronic access token includes fields that are only used for some initiation tokens. For example, the electronic access token may include a customer name field that is not populated where an initiation token is used that is not customer-specific.

A "session supplier" ("SS"). This is software that interfaces with a session initiation device to create and populate an electronic access token. Every session supplier has a common architected interface defining (a) the message sequence to a session supplier aggregate, and (b) the electronic access token data structure, so that a new session initiation device and associated session supplier can easily be added by ensuring that the new session supplier conforms to the common architected interface.

A "session supplier aggregate" (SSA"). This is software that can receive an electronic access token from any of the session suppliers executing on the SST, but only conveys one electronic access token per session to a session component. The session supplier aggregate acts as a filter to ensure only one electronic access token is passed to the session component. Optionally, the session supplier aggregate may also operate to ensure that there are sufficient session initiation devices present to enable the SST to operate.

A "session component" ("SC"). This is software that manages the customer's session at the SST. The session component opens a session for a customer, interacts with an application flow (which manages the presentation of information to the customer during the session), interacts with transaction objects (which provide transaction functions to the customer), and closes the session when the customer completes all desired transactions.

A "self-service terminal" ("SST"). This is a kiosk that is suitable for allowing a user to conduct a transaction or to access information in an unassisted manner (that is, without requiring help from a human) and/or in an unattended environment (that is, an area that is not permanently supervised by someone to ensure that the SSTs are not being misused). An SST deployer may decide to provide human assistance and/or supervision for customers of the SST; however, SSTs are typically designed so that such assistance and/or supervision is not essential.

A "screen". This denotes the graphics, text, controls (such as menu options), and such like, that are rendered on an SST display; the term "screen" as used herein does not refer to the hardware (that is, the display) that renders the graphics, text, controls, and such like.

SUMMARY OF INVENTION

Accordingly, the invention generally provides methods, systems, apparatus, and software for an SST that provides improved session initiation.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a self-service terminal comprising:

a plurality of session initiation devices, each associated with an initiation token, so that a customer can initiate a transaction using one of a plurality of different initiation tokens;

a plurality of session suppliers, each session supplier being associated with one of the session initiation devices, and each session supplier being operable: (i) to receive from its associated session initiation device, information from an initiation token provided by a customer, and (ii) to create an electronic access token based on the received information;

a session supplier aggregate operable to receive an electronic access token from one of the session suppliers for each session to be created; and a session component operable (i) to receive the electronic access token from the session supplier aggregate and (ii) to create a session based on the received electronic access token.

The session component may be further operable to provide transaction options based on the electronic access token.

It should be appreciated that the electronic access token is a defined data structure so that if a new session initiation device (for example a barcode scanner) is added, then a new session supplier can be provided that extracts information from the new session initiation device (for example, a barcode presented to a barcode scanner) and creates an electronic access token based on this extracted information. Since all session suppliers provide an electronic access token having the same structure, the session component operates independently of the particular initiation token used to initiate the customer transaction.

Each of the plurality of session initiation devices may be associated with a physical initiation token, so that a customer can initiate a transaction using one of a plurality of different physical initiation tokens. One of the session initiation devices may be associated with a non-physical initiation token, and other session initiation devices may be associated with physical initiation tokens.

The session initiation devices may comprise two or more of the following: a card reader; an RF reader; a biometrics reader; a camera; barcode scanner; a keypad; and a touch-screen display.

The session component may be operable to provide transaction options based on the electronic access token by (i) transmitting the electronic access token to a plurality of transaction objects, and (ii) receiving a response from each transaction object indicating whether the customer can access that transaction based on information contained within the electronic access token.

Each session supplier may be responsive to an enable command, which enables the session supplier to receive a customer interaction relating to initiation of a session at its associated session initiation device.

Each session supplier may also be responsive to a reset command, which (i) clears any electronic access token stored therein, (ii) returns any inserted media to a customer, and (iii) disables the session supplier so that no customer interaction relating to session initiation can be received by the session supplier.

Each session supplier may be operable to create a customer accepted event, which reports to the session supplier aggregate that an electronic access token has been created.

According to a second aspect there is provided a runtime software platform for a self-service terminal, the runtime software platform comprising:

a plurality of session suppliers, each session supplier being associated with one of a plurality of session initiation devices, and each session supplier being operable: (i) to receive from its associated session initiation device, information extracted from a physical initiation token provided by a customer, and (ii) to create an electronic access token based on the received information;

a session supplier aggregate operable to receive the electronic access token from one of the session suppliers for each session to be created;

a session component operable (i) to receive the electronic access token from the session supplier aggregate, (ii) to create a session based on the received electronic access token, and (iii) to provide transaction options based on the electronic access token.

The runtime software platform may be embodied on a data carrier.

The data carrier may comprise computer memory within an SST.

According to a third aspect there is provided a self-service terminal network comprising a plurality of self-service terminals according to the first aspect, each self-service terminal being coupled to an authorization server for authorizing transactions entered at the self-service terminals.

According to a fourth aspect there is provided a method of initiating a session at a self-service terminal, the method comprising:

receiving one of a plurality of different initiation tokens from a customer;

deriving information from the received initiation token;

creating an electronic access token based on the derived information;

using the created electronic access token to start a session for the customer, and providing transaction options to the customer based on the created electronic access token.

The step of providing transaction options to the customer based on the created electronic access token may further comprise (i) transmitting the created electronic access token to a plurality of transaction objects, and (ii) receiving a response from each transaction object indicating whether the customer can access that transaction based on information contained within the created electronic access token.

For clarity and simplicity of description, not all combinations of elements provided in the aspects of the invention recited above have been set forth expressly. Notwithstanding this, the skilled person will directly and unambiguously recognize that unless it is not technically possible, or it is explicitly stated to the contrary, the consistory clauses referring to one aspect of the invention are intended to apply mutatis mutandis as optional features of every other aspect of the invention to which those consistory clauses could possibly relate.

These and other aspects will be apparent from the following specific description, given by way of example, with reference to the accompanying drawings.

DETAILED DESCRIPTION

Figure 1:
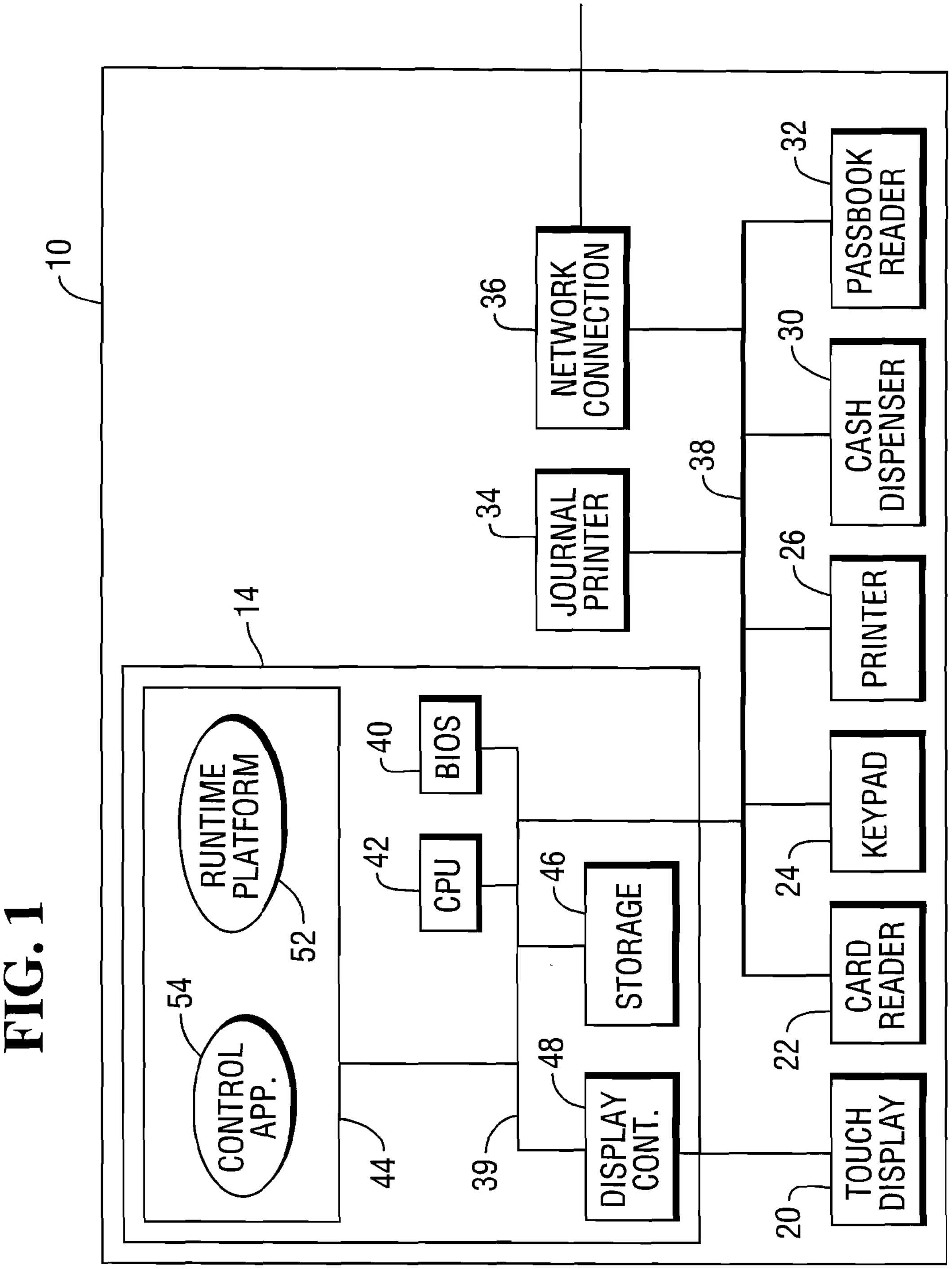
FIG. 1 is a simplified, schematic diagram of a self-service terminal (SST) according to one embodiment of the present invention.

Reference is first made to FIG. 1, which is a simplified, schematic diagram of a self-service terminal (SST) 10, in the form of an automated teller machine (ATM), according to one embodiment of the present invention.

The ATM 10 comprises a plurality of modules for enabling transactions to be executed and recorded by the ATM 10. These ATM modules comprise: a controller module 14, a customer display module (with integrated touch-sensitive panel) 20, a card reader/writer module 22, an encrypting keypad module 24, a receipt printer module 26, a cash dispenser module 30, a passbook reader/writer module 32, a journal printer module 34 for creating a record of every transaction executed by the ATM 10, and a network connection module 36 (in the form of an enhanced network card) for accessing a remote authorization system (not shown) and a remote state of health management system (not shown).

Some of the modules listed above are session initiation devices (SIDs) because they can be used by a customer to initiate a transaction. The SIDs listed above include: the customer display module (with integrated touch-sensitive panel) 20; the card reader/writer module 22; and the passbook reader/writer module 32. To use these SIDs 20,22,32, a customer enters: a unique username and password as an initiation token (for the touchscreen display module 20, which can present a keyboard on the display), a magnetic stripe card as a physical initiation token (for the card reader/writer module 22), or a passbook as a physical initiation token (for the passbook reader/writer module 32).

The controller 14 comprises a BIOS 40 stored in non-volatile memory, a microprocessor 42, main memory 44, storage space 46 in the form of a magnetic disk drive, and a display controller 48 in the form of a graphics card.

The customer display module 20 is connected to the controller module 14 via the graphics card 48 installed in the controller module 14. The other ATM modules (22 to 36) are connected to the ATM controller 14 via a device bus 38 and one or more internal controller buses 39.

When the ATM is powered up, the main memory 44 is loaded with an ATM runtime platform 52 and a control application 54, both of which were stored on the magnetic disk drive 46.

The ATM runtime platform 52 includes: (i) components from a conventional operating system (in this embodiment, Windows XP (trademark), available from Microsoft Corporation (trade mark)), and (ii) proprietary components, including some components that will be described in detail herein.

As is known in the art, the control application 54 presents a sequence of screens on the ATM display module 20 to a customer at the ATM, collates information from the customer (for example, customer account information from a customer's ATM card, transaction request, transaction amount, and the like), obtains authorization for a transaction request from a remote authorization server (not shown), and instructs modules within the ATM 10, as needed, to fulfill an authorized transaction.

Components within the runtime platform 52 will now be described with reference to FIG. 2, which is a diagram illustrating the interaction between software components within the runtime platform 52 and a software component within the control application 54.

In addition to conventional ATM runtime components (such as drivers for ATM-specific devices, a supervisor application, a diagnostic application, and the like), the runtime platform 52 further comprises: three SID session supplier components (a card reader session supplier 60, a passbook session supplier 62, and a touchscreen session supplier 64); a session supplier aggregate component 70; a session component 72; a service aggregate component 74; and three transaction components (a bill payment transaction 80, a withdrawal transaction 82, and a balance request transaction 84).

The SSA 70 handles communication with all SSs 60,62,64, at the request of the SC 72, and effectively hides the fact that there are multiple session initiation devices 20,22,32. The SSA 70 provides the same interface to the SC 72 that the SSs 60,62,64 provide to the SSA 70.

The SSA 70 includes code providing availability rules. These availability rules provide a structure for allowing the availability of the SSA 70 to be dependent on the availability of predefined combinations of session suppliers 60,62,64. The predefined combinations can be configured by an administrator using Boolean logic. The availability of the SSA 70 to the SC 72 is dependent on at least one of the predefined combinations being present.

The availability rules within the SSA 70 enable a single SST application to be created for execution on a plurality of different SSTs, each with different session initiation devices (SIDs). For example, the SSA 70 may be configured so that it is available (and thus the SC 72 available) if there is a working card reader module 22 (card reader SS 60) OR if there is a working passbook reader module 32 (passbook reader SS 62).

Figure 2:
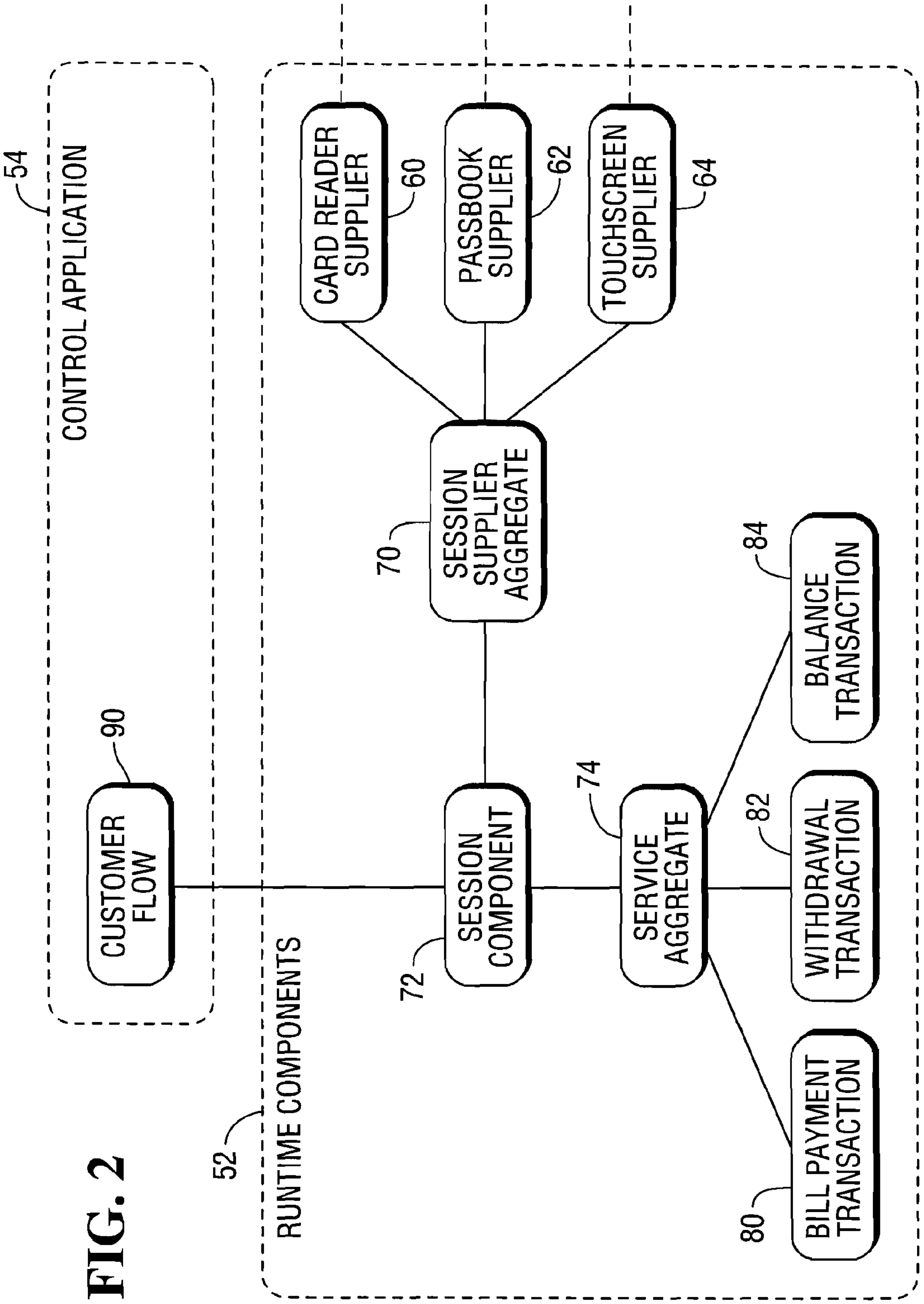
FIG. 2 is a simplified diagram illustrating interaction between software components within a memory of the SST of FIG. 1.

As shown in FIG. 2, the control application 54 also includes a customer flow component 90 that communicates with the session component (SC) 72.

Figure 3:
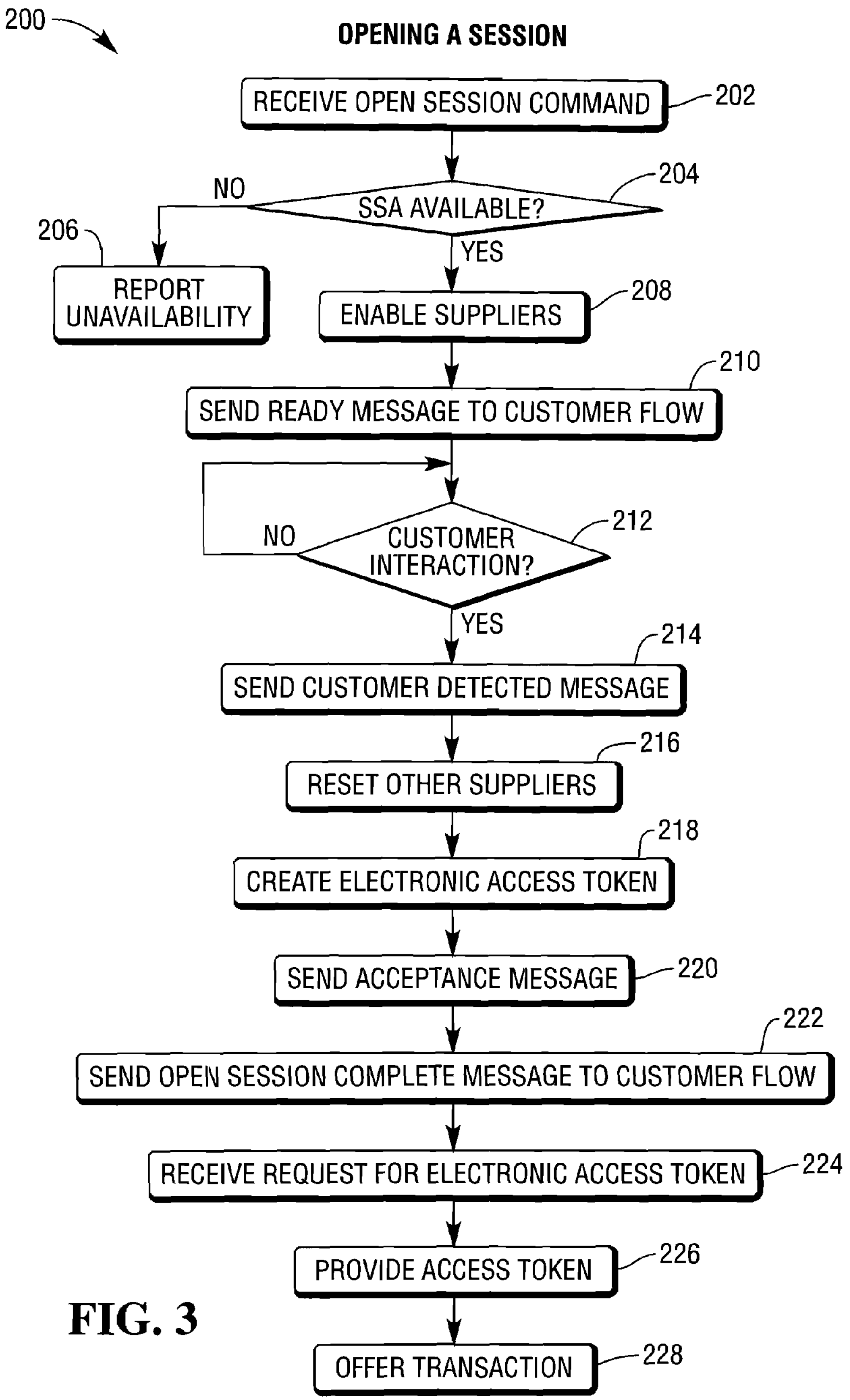
FIG. 3 is a flowchart illustrating steps performed by the software components of FIG. 2 in opening a session for a customer using a first type (a magnetic stripe card) of physical initiation token.

The interaction between these components at the start of a customer transaction will now be described with reference to FIG. 3, which is a flowchart 200 illustrating steps performed by the software components of FIG. 2 in opening a session for a customer who initiates a transaction using a magnetic stripe card.

The first step is for the session component 72 to receive an open session command from the customer flow component 90 (step 202).

In response to this command, the session component 72 confirms the availability of the SSA 70 (step 204).

If the SSA 70 is unavailable, then the session component 72 cannot begin a session and responds to the customer flow component 90 so that no attract screen is presented to potential customers at the ATM customer touchscreen display module 20 (step 206).

The SSA 70 will be available if the availability rules within the SSA 70 are satisfied. In this embodiment, the availability rules are as follows: the SSA 70 is available IF touchscreen display session supplier 64 is available OR card reader module session supplier 60 is available OR passbook reader module session supplier 62 is available. In this example, all three SIDs 20,22,32 are available, the three respective session suppliers 64,60, 62 are available, so the SSA 70 is available.

The next step is for the session component 72 to enable the SSA 70, which in turn enables all of the SID session supplier components 60,62,64 on the ATM 10 (step 208). Each of the SID session suppliers 60,62,64 responds to the SSA 70 with an enabled message to indicate that they are ready to receive a customer interaction. The SSA 70 then responds to the SC 72 with an enabled message to indicate that it is ready.

In response to this enabled message from the SSA 70, the SC 72 sends a ready message to the customer flow component 90 (step 210). This informs the customer flow component 90 that it can change the screen presented on the customer display module 20 to one that invites a passer by (a potential customer) to initiate a transaction at the ATM 10. This is typically referred to as an "attract screen".

At this stage, all three SIDs 20,22,32 are active and awaiting activity from a potential customer. The SC 72 waits until a customer activity is actually detected at one of the SIDs 20,22,32 by one of the SID Session Suppliers 60,62,64 (step 212).

In this embodiment, the customer flow component 90 subscribes to events from the SID session suppliers 60,62,64 so that the customer flow component 90 receives notifications of events occurring at the SIDs 20,22,32.

When one of the SIDs 20,22,32 (in this example, the card reader/writer module 22) detects a customer activity (in this example, the customer entering his/her magnetic stripe card) then the appropriate SID session supplier (the card reader session supplier 62) sends a customer detected message to the SSA 70, which in turn sends a customer detected message to the SC 72, which relays this to the customer flow component 90 (step 214).

The SSA 70 sends a reset command to the other two SID session suppliers 60,64 to prevent them from attempting to create an electronic access token during the current session (step 216). Although this step of the SSA 70 sending reset commands is described as being subsequent to the SSA 70 sending a customer detected message to the SC 72, in practice either the two steps occur together or the SSA 70 sends the customer detected message to the SC 72 after sending the reset commands to the two SID session suppliers 60,64. This is to ensure that neither of the two SID session suppliers 60,64 are used in the window between the customer using the card reader session supplier 62 and the SSA 70 sending the reset commands to the other two session suppliers 60,64.

On receipt of this reset command, the two SID session suppliers 60,64 clear any electronic access token they are currently storing.

The two session suppliers 60,64 that have been reset can still be used by the customer flow component 90 if they are required to complete a transaction during the current session (for example, to update details on the customer's passbook, or to allow the customer to enter details via the touchscreen), but they cannot be used to create a new session while the current session is still open.

The customer flow component 90 receives this message from the card reader session supplier 62 (via the SSA 70 and SC 72) and advances the transaction flow so that a screen is presented on the customer display module 20 inviting the customer to enter his/her PIN.

While this is occurring, the card reader session component 62 creates an electronic access token using data read from the customer's card by the card reader/writer module 22 (step 218).

When the card reader session component 62 has created the electronic access token by populating all of the relevant fields and confirming that every required field has been populated, it then sends a customer accepted message to the SSA 70, which in turn sends a customer accepted message to the SC 72 (step 220).

The SC 72 acts on this customer accepted message by sending an open session complete message to the customer flow component 90 (step 222). This message informs the customer flow component 90 that a session has been created for the customer and that an electronic access token is ready.

The customer flow component 90 then requests the electronic access token from the SC 72. The SC 72 receives this request and relays to the SSA 70, which in turn relays the request to the card reader session supplier 62 (step 224).

The card reader session supplier 62 then provides the electronic access token to the customer flow component 90 (step 226).

The customer flow component 90 uses the electronic access token to ascertain what transactions can be offered to the customer (step 228). This can be implemented in different ways. One way is for the SC 72 to pass the electronic access token to the service aggregate component 74. The service aggregate component 74 passes the electronic access token to each transaction 80,82,84, and each transaction reports its availability back to the service aggregate component 74. If at least one transaction is available then the customer session will proceed, and the customer will be offered the available transactions. This has the advantage that only the session suppliers 60,62,64 and the transactions 80,82,84 are required to know the structure of the electronic access token. The customer flow component 90, the SSA 70, and the SC 72 do not need to know the structure of the electronic access token, which has the benefit of allowing a generic flow and SSA 70 to be used.

Once a session has been created, the transaction proceeds in a conventional manner, as is well known to those of skill in the art.

Figure 4:
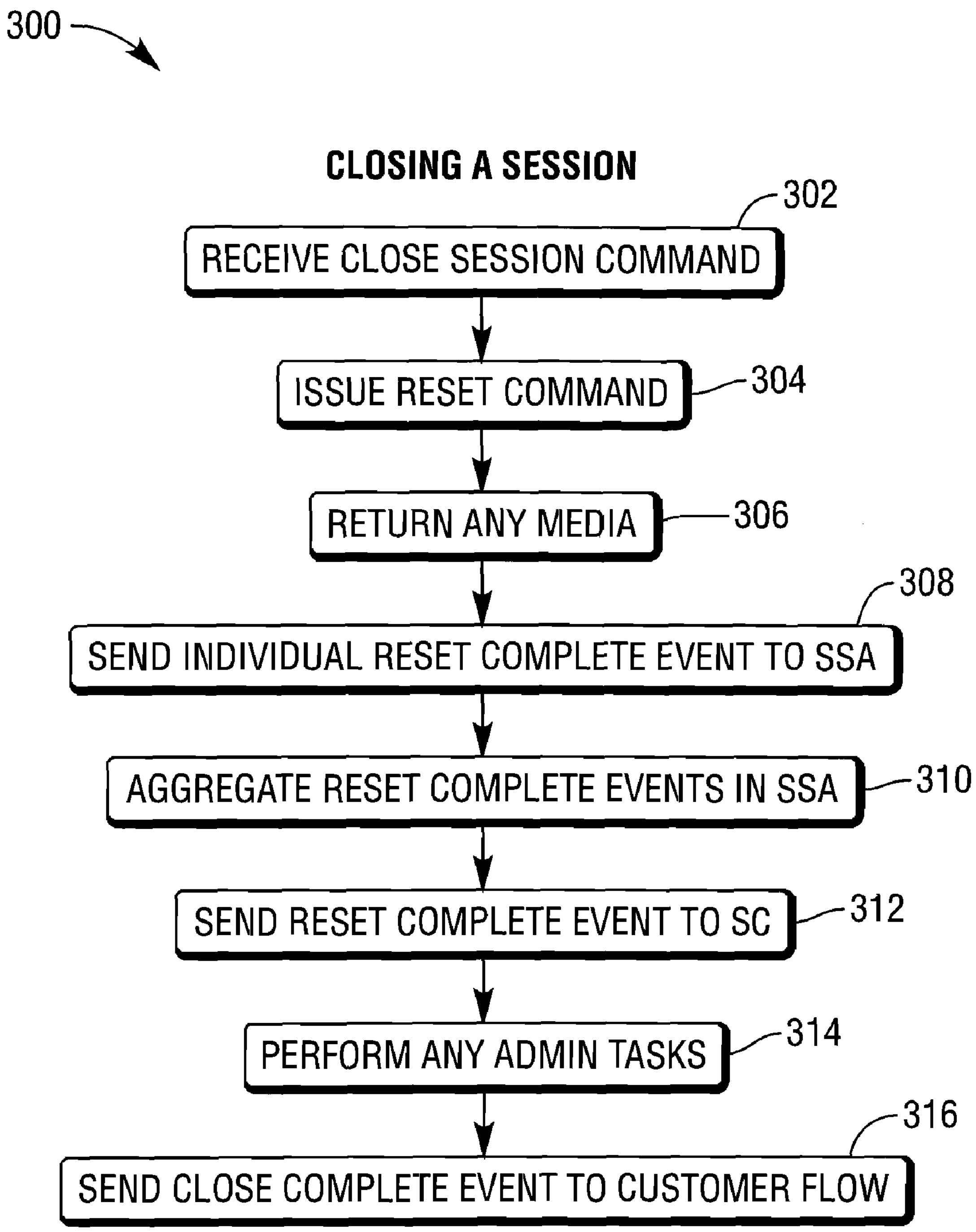
FIG. 4 is a flowchart illustrating steps performed by the software components of FIG. 2 in closing a session for the customer using the first type (the magnetic stripe card) of physical initiation token.

Reference will now also be made to FIG. 4, which is a flowchart 300 illustrating steps performed by the software components of FIG. 2 in closing a session for the customer who initiated a transaction using a magnetic stripe card as described with reference to FIG. 3.

The first step is for the session component 72 to receive a close session command from the customer flow component 90 (step 302).

The SC 72 then relays this reset command to the SSA 70, which in turn relays the reset command to all SID session suppliers 60,62,64 (step 304).

In response to receiving the reset command, each session supplier 60,62,64 returns to the customer any media that was inserted by the customer (step 306). In this example, the card reader session supplier 62 ejects the customer's magnetic stripe card for the customer to retrieve. The card reader session supplier 62 creates a card ejected event when this occurs. The customer flow component 90 detects this event and advances the transaction flow so that a screen is presented to the customer advising him/her to take his card. The card reader session supplier 62 creates a card taken event so that the customer flow component 90 can ascertain from this event that the customer has taken his/her card, and can advance the transaction flow accordingly.

When each session supplier 60,62,64 has returned any inserted media to the customer, that session supplier then sends a reset complete message to the SSA 70 (step 308).

When all session suppliers have sent a reset complete message to the SSA 70, then the SSA aggregates these messages (step 310), and then sends a reset complete message to the SC 72 (step 312).

On receiving the reset complete message from the SSA 70, the SC 72 performs any required administrative tasks to ensure that the SIDs will not be prevented from being used another customer (step 314) and then sends a close session complete message to the customer flow component 90 (step 316).

On receipt of the close session complete message, the customer flow component 90 advances the transaction flow to display a thank you screen to the customer who has just completed the transaction.

It should now be appreciated that in the above embodiment, each session supplier is able to ascertain, maintain, and publish its own availability status.

It should also be appreciated that the above embodiment describes a simplified transaction. In practical embodiments, the control application 54 and runtime components 52 would include logic to handle any media jams, any SID failures, diagnostic functions, and the like.

Various modifications may be made to the above described embodiment within the scope of the invention, for example, in other embodiments, SSTs other than ATMs may be provided.

In other embodiments, a greater or fewer number of session initiation devices may be provided than three. In other embodiments, different session initiation devices may be provided than those described above. For example, in some embodiments, a user may insert currency into a currency depository to initiate a session; in other embodiments, a customer may insert a check into a check depository to initiate a session; in other embodiments, a customer may type in a username on a touchscreen display to start a session; in other embodiments, a customer may scan a barcode on a voucher or coupon to start a session. Other initiation tokens and session initiation devices are also possible.

In other embodiments different transactions may be provided than those described above, for example, cashing a check, depositing cash, converting a casino chip into cash, sending a wire transfer of money, purchasing a ski pass, or the like.

In the above embodiment, only one initiation token could be used to initiate a session. In other embodiments, multiple initiation tokens may be used to initiate a session. In such embodiments, a single session supplier may be provided for multiple session initiation devices, so that only one session supplier creates an electronic access token. In other embodiments, one electronic access token may be created, then modified or replaced by another electronic access token during the same session, for example, if a user is asked to enter one token for a checking account and a different token for a savings account, in the same transaction.

In other embodiments, the customer flow component 90 may ascertain what transactions to offer the customer by comparing data in the electronic access token with stored logic that indicates what transaction options are available for what types of customer. This disadvantage of this approach, however, is that the customer flow component 90 must have some knowledge of the electronic access token.

In other embodiments that do not include a touch-sensitive display module, a customer may type in a unique number using a conventional keypad.

In other embodiments, a customer may merely have to touch a key or a touch-sensitive panel on a display module to initiate a transaction. Transactions that may be initiated using this technique may include a stock price quotation transaction that does not levy a fee or require any customer identification.

The steps of the methods described herein may be carried out in any suitable order, or simultaneously where appropriate. The methods described herein may be performed by software in machine readable form on a tangible storage medium or as a propagating signal.

The terms “comprising”, “including”, “incorporating”, and “having” are used herein to recite an open-ended list of one or more elements or steps, not a closed list. When such terms are used, those elements or steps recited in the list are not exclusive of other elements or steps that may be added to the list.

Unless otherwise indicated by the context, the terms “a” and “an” are used herein to denote at least one of the elements, integers, steps, features, operations, or components mentioned thereafter, but do not exclude additional elements, integers, steps, features, operations, or components.

What is claimed is:

1. A self-service terminal comprising:

a plurality of session initiation devices, each associated with an initiation token, so that a customer can initiate a transaction using one of a plurality of different initiation tokens;

a plurality of session suppliers, each session supplier being associated with one of the session initiation devices, and each session supplier being operable: (i) to receive from its associated session initiation device, information from an initiation token provided by a customer, and (ii) to create an electronic access token based on the received information;

a session supplier aggregate compatible with the plurality of session suppliers and able to receive an electronic access token from any of the plurality of session suppliers, but only conveying one electronic access token for each session to be created; and a session component operable (i) to receive the one electronic access token from the session supplier aggregate and (ii) to create a session based on the received electronic access token.

2. A terminal according to claim 1, wherein the session component is further operable to provide transaction options based on the electronic access token.

3. A terminal according to claim 1, wherein each of the plurality of session initiation devices is associated with a physical initiation token, so that a customer can initiate a transaction using one of a plurality of different physical initiation tokens.

4. A terminal according to claim 1, wherein at least one of the session initiation devices is associated with a non-physical initiation token, and at least some session initiation devices are associated with physical initiation tokens.

5. A terminal according to claim 1, wherein the session initiation devices comprise two or more devices selected from the: a card reader; an RF reader; a biometrics reader; a camera; barcode scanner; a keypad; and a touchscreen display.

6. A terminal according to claim 1, wherein the session component is operable to provide transaction options based on the electronic access token by (i) transmitting the electronic access token to a plurality of transaction objects, and (ii) receiving a response from each transaction object indicating whether the customer can access that transaction based on information contained within the electronic access token.

7. A terminal according to claim 1, wherein each session supplier is responsive to an enable command, which enables the session supplier to receive a customer interaction relating to initiation of a session at its associated session initiation device.

8. A terminal according to claim 1, wherein each session supplier is also responsive to a reset command, which (i) clears any electronic access token stored therein, (ii) returns any inserted media to a customer, and (iii) disables the session supplier so that no customer interaction relating to session initiation can be received by the session supplier.

9. A terminal according to claim 1, wherein each session supplier is operable to create a customer accepted event, which reports to the session supplier aggregate that an electronic access token has been created.

10. A runtime software platform for a self-service terminal embodied on a memory of the self-service terminal, the runtime software platform comprising:

a plurality of session suppliers, each session supplier being associated with at least one of a plurality of session initiation devices, and each session supplier being operable: (i) to receive from its associated session initiation device, information extracted from a physical initiation token provided by a customer, and (ii) to create an electronic access token based on the received information;

a session supplier aggregate compatible with the plurality of session suppliers and able to receive an electronic access token from any of the plurality of session suppliers, but only conveying one electronic access token for each session to be created; and a session component operable (i) to receive the one electronic access token from the session supplier aggregate, (ii) to create a session based on the received electronic access token, and (iii) to provide transaction options based on the electronic access token.

11. A runtime software platform according to claim 10, wherein the runtime software platform is embodied on a non-transitory data carrier.

12. A runtime software platform according to claim 10, wherein each session supplier has a common architected interface defining (a) a message sequence to the session supplier aggregate, and (b) a common electronic access token data structure, so that a new session initiation device and associated new session supplier can be added by ensuring that the associated new session supplier conforms to the common architected interface.

13. A self-service terminal network comprising a plurality of self-service terminals according to claim 1, each self-service terminal being coupled to an authorization server for authorizing transactions entered at the self-service terminals.

14. A method of initiating a session at a self-service terminal, the method comprising:

receiving one of a plurality of different initiation tokens from a customer using one of a plurality of session initiation devices, each session initiation device associated with one of a plurality of session suppliers;

deriving information from the received token by the one of a plurality of session suppliers associated with said one of the session initiation devices, and creating an electronic access token based on the derived information;

conveying only one electronic access token for each session to be created by a session supplier aggregate compatible with the plurality of session suppliers and able to receive an electronic access token from any of the plurality of session suppliers;

using the created electronic access token to start a session for the customer; and providing transaction options to the customer by a session component based on the created electronic access token.

15. A method according to claim 14, wherein step of providing transaction options to the customer based on the created electronic access token further comprises (i) transmitting the created electronic access token to a plurality of transaction objects, and (ii) receiving a response from each transaction object indicating whether the customer can access that transaction based on information contained within the created electronic access token.

16. A terminal according to claim 1 wherein each session supplier has a common architected interface defining (a) a message sequence to the session supplier aggregate, and (b) a common electronic access token data structure, so that a new session initiation device and associated new session supplier can be added by ensuring that the associated new session supplier conforms to the common architected interface.

17. A terminal according to claim 16 wherein the new session initiation device is a barcode scanner.

18. A terminal according to claim 1 wherein the session supplier aggregate handles communication with all of the plurality of session suppliers effectively hiding that there are a plurality of session initiation devices.

19. A terminal according to claim 1 wherein upon establishing the session with one session supplier, the session supplier aggregate sends a reset command to any other of the plurality of session suppliers to prevent them from attempting to create an electronic access token during the session.

20. A runtime software platform for a self-service terminal stored on a non-transitory computer readable medium, the runtime software platform when executed by a computer implementing:

a plurality of session suppliers, each session supplier being associated with at least one of a plurality of session initiation devices, and each session supplier being operable: (i) to receive from its associated session initiation device, information extracted from a physical initiation token provided by a customer, and (ii) to create an electronic access token based on the received information;

a session supplier aggregate compatible with the plurality of session suppliers and able to receive an electronic access token from any of the plurality of session suppliers, but only conveying one electronic access token for each session to be created; and a session component operable (i) to receive the one electronic access token from the session supplier aggregate, (ii) to create a session based on the received electronic access token, and (iii) to provide transaction options based on the electronic access token.

* * * * *